Patented Feb. 20, 1951

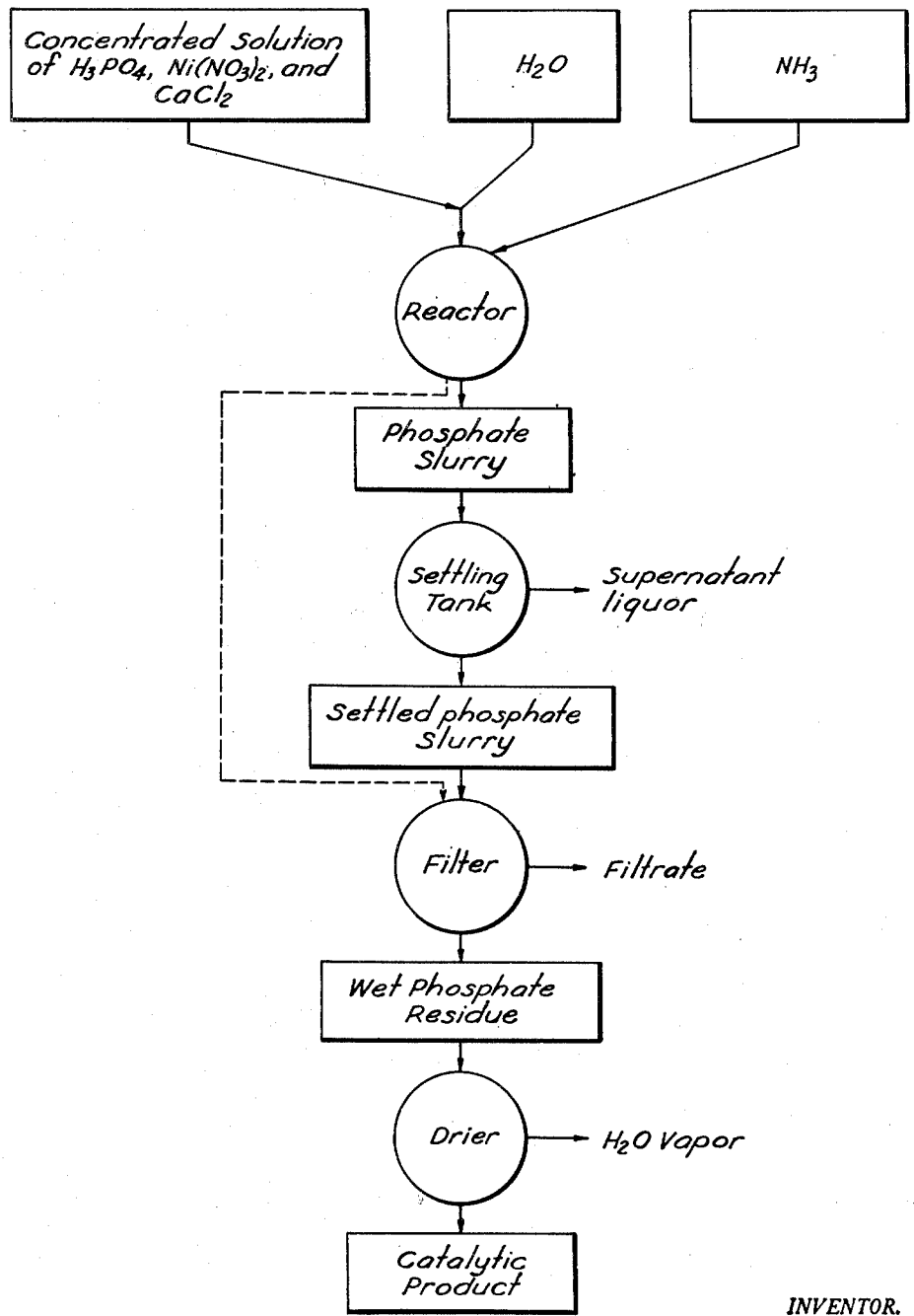

2,542,813

UNITED STATES PATENT OFFICE 2,542,813

MANUFACTURE OF CATALYST

Sheldon B. Heath, Midland, Mich., assignor to The Dow Chemical Company, Midland, Mich., a corporation of Delaware Application July 25, 1946, Serial No. 686,134

12 Claims. (Cl. 23—105)

This invention concerns an improved method of making certain metal phosphate catalysts which are highly effective in the dehydrogenation of olefines, having from 4 to 6 carbon atoms in a carbon chain of the molecule, to form corresponding diolefines. It also concerns a new physical form of such catalysts.

Phosphate catalysts of the type with which this invention is concerned, and a batchwise method of making the same, are disclosed in a copending application of E. C. Britton et al., Serial No. 529,404, filed April 3, 1944, now Patent No. 2,442,319. The catalysts comprise a normal metal phosphate material consisting of phosphate radicals chemically combined with calcium and nickel in an atomic ratio of calcium to nickel greater than 6.5 and preferably from 7.5 to 9.2. The catalysts are far more effective than a mechanical mixture of corresponding amounts of calcium phosphate and nickel phosphate in catalyzing the dehydrogenation of an olefine, e. g. butylene, to form a corresponding conjugated diolefine. In the above-mentioned Britton et al. application, it is suggested that the catalyst probably contains the atoms of calcium and nickel in a definite spacial relationship and it is taught that the activity and chemical behavior of the catalyst are dependent both on its chemical composition and on the conditions under which it is prepared.

According to said Britton et al. application, Serial No. 529,404, the catalyst may be formed by adding an aqueous solution of calcium and nickel salts, containing calcium and nickel in the relative proportions required in the catalyst, to an aqueous solution of a soluble orthophosphate under neutral or preferably alkaline conditions, e. g. under conditions such that the resultant mixture is of a pH value between 7 and 12. The solution of the calcium and nickel salts is preferably added with stirring to an aqueous solution of di- or tri-ammonium phosphate in amount sufficient to maintain the mixture in alkaline condition without addition of an alkaline substance other than the ammonium phosphate. As alternative procedure, the catalyst may be formed by adding an aqueous solution of phosphoric acid and the calcium and nickel salts to an aqueous solution of an alkali, preferably ammonia. During either such addition, a normal calcium nickel phosphate material is formed as fine flocks which settle slowly. After the flocculent phosphate product has settled, it is separated from the supernatant clear liquor and washed repeatedly with water to remove soluble nickel compounds and chloride ions as completely as possible. Soluble nickel compounds, if retained, produce catalytic effects other than that desired and chloride ions tend to poison, or deactivate, the phosphate catalyst. The washed phosphate slurry is filtered to remove a further amount of water, and the residue is dried. The dried material is ground to a powder, treated with a lubricant, and pressed into pellets of size suitable for use as a catalyst in a dehydrogenation process. Frequently, a minor amount of chromium oxide is added, e. g. as a promoter, prior to pelleting of the material.

I have tested the above-described procedures of the Britton et al. application, Serial No. 529,404, for formation and precipitation of the calcium nickel phosphate catalyst and have found that, although they result in a catalytic product which is exceptionally effective for the intended purpose, the procedures themselves possess disadvantages which render them poorly suited to commercial practice. For instance, the procedures of said application result in formation of the calcium nickel phosphate in the form of fine flocks which are dispersed throughout the reaction liquor and are extremely slow in settling. On permitting the flocculent aqueous mixture to stand without agitation for 6 hours or longer, the phosphate usually settles to form, as a lower layer, a thin aqueous slurry which occupies about half of the volume of the entire mixture and which usually contains only from 1 to 2 per cent by weight of the phosphate product. Upon subsequently separating and filtering such lower layer, a phosphate filter cake is obtained which usually retains 93 per cent by weight or more of water. In order to dry the product, it is necessary that a large proportion of water be evaporated. This is time-consuming and adds considerably to the cost of the product.

Furthermore, since the calcium nickel phosphate catalyst tends to be poisoned, or decreased in activity, by chlorides, if retained therewith, it is indicated in the aforementioned Britton et al. application that the flocculent calcium nickel phosphate should be washed as free of chlorides as possible with water, which obviously must be of high purity. Most water readily available, e. g. from lakes, rivers, wells, or city mains, contains an appreciable amount of dissolved chlorides and other salts. Since a large proportion of water is retained together with the phosphate product after the latter has settled or been filtered, a corresponding proportion of the chlorides and other soluble impurities initially present in the water would be retained together with the product if the latter were to be dried directly, i. e. without first being washed free of the impurities with substantially pure water. Due to difficulty of filtering the aqueous phosphate dispersion and washing the product while on a filter, washing is best accomplished by repeatedly carrying out a cycle of operations wherein the phosphate slurry is diluted with pure water, permitted to settle by standing for several hours and thereafter separated from the clear supernatant liquid. Such washing operations are time-consuming, require use of large quantities of water of exceptional purity, e. g. distilled water, and necessitate provision of storage tanks and other apparatus for carrying out the washing operations.

It is an object of this invention to provide an improved method of precipitating a calcium nickel phosphate catalyst, whereby the latter is obtained as a relatively dense material which settles rapidly to form, as a lower layer of the reacted mixture, an aqueous slurry of the phosphate in a concentration far higher than that of the slurry similarly formed from the reacted mixture of the aforementioned Britton et al. application. Another object is to provide such improved method of forming an aqueous calcium nickel phosphate slurry, which slurry may be filtered to obtain a residual filter cake that is far richer in the phosphate, and of lower water content, than is the residue obtained by filtering the aqueous calcium nickel phosphate slurry of said Britton et al. application. A further object is to provide an improved method of making the phosphate which obviates necessity for employment of exceptionally pure water in the process and which also obviates necessity for the repeated, time-consuming operations of washing the phosphate, e. g. by decantation, such as are required in the process of the Britton et al. application. A still further object is to provide an improved method which permits production of the calcium nickel phosphate catalyst readily, economically and in a continuous manner. Other objects will be apparent from the following description of the invention.

The accompanying drawing is a flow sheet showing an order of operations for making the catalytic phosphate in a continuous manner. The flow sheet includes certain steps and apparatus which are desirable, but not essential. An alternative sequence of operations which omits non-essential steps and operations is indicated by a dotted line. The flow sheet accords with the invention as hereinafter described.

I have discovered that by feeding separate streams of an alkali, preferably ammonia, and of an aqueous solution of calcium and nickel salts (in relative proportions corresponding to between 6.5 and 12, preferably between 7.5 and 9.2, atoms of calcium per atom of nickel), one of which streams contains a dissolved ortho-phosphate, into a reaction chamber at relative rates of flow such that the resultant mixture is maintained at pH values between 7.7 and 8.3, and by retaining within the reaction zone a portion of the calcium nickel phosphate which is thereby formed and precipitated, the calcium nickel phosphate is caused to precipitate as flocculent material which settles rapidly to form, as a lower layer of the resultant mixture, an aqueous phosphate slurry that contains 5 per cent by weight or more, usually from 7.5 to 10 per cent, of the phosphate. The reaction mixture, or preferably the settled lower layer thereof, may be filtered to obtain a filter cake which contains 20 per cent or more, usually about 22 per cent, of the phosphate.

In order to obtain a rapid settling phosphate of good catalytic activity, it is important that the two streams of starting materials flow into admixture with one another at relative rates such as to maintain the resultant mixture of a pH value between 7.7 and 8.3. The phosphate precipitated from a mixture of higher pH value is of good catalytic activity, but is extremely slow in settling. The phosphate precipitated from a mixture of pH value below 7.7, e. g. between 6.5 and 7.7, settles rapidly, but is less active as a catalyst for the dehydrogenation of butylene to form butadiene than is phosphate precipitated from mixtures of higher pH values. It also appears necessary, in order to obtain a phosphate product of rapid settling rate, that a portion of the precipitated phosphate be retained in the mixing and reaction zone so that, once the process is started, the catalytic phosphate is being formed and precipitated in the presence of a slurry of the calcium nickel phosphate. It is probable that the phosphate already precipitated serves as nuclei for precipitation of further amounts of phosphate and aids in controlling the particle size and physical form of the material undergoing precipitation, but the invention is not restricted to this theory as to a reason for the result obtained. Presence of preformed particles of calcium nickel phosphate during precipitation of further amounts of the latter is not, of itself, sufficient to cause formation of a rapid settling product, i. e. it is also necessary that the reaction mixture as a whole be maintained at an average pH value of between 7.7 and 8.3.

The procedure in bringing the two streams of starting materials together and admixing them also has an influence on the rate of settling of the phosphate which is precipitated. It is desirable that the points of feed to the mixing chamber of the streams of the two starting materials be remote from one another and that the mixture be stirred, or otherwise agitated, during introduction of the starting materials. Usually, inlets for the different kinds of starting materials are separated by a distance of a foot or more. Either starting material may, of course, be introduced through a plurality of inlets. It is probable that these precautions of separating the points of feed of the different starting materials and of agitating the mixture result in actual contact between the starting materials in a zone, or zones, which are of approximately the pH value which is average for the mixture as a whole, i. e. the procedure just recommended presumably results in formation and coagulation of calcium nickel phosphate in zones which are actually of pH values between 7.7 and 8.3. It will be understood that the minimum distance between points of feed of the different starting materials is dependent in part upon the rates of feed, and that it may be less with low rates of feed than with high rates of feed. An increase in the degree, or efficiency, of stirring of the mixture will also permit a decrease in minimum distance between the points of feed. In actual manufacture of the phosphate, the points of feed of the two kinds of starting materials may advantageously be separated by a distance of 5 feet or more.

It will be noted that the method of this invention differs from that of the aforementioned Britton et al. application, Serial No. 529,404, as to the mode of mixing the starting materials. In the Britton et al. application a solution of calcium and nickel salts is added to an alkaline solution, whereas in the present process separate streams of an alkali and of a solution of said salts and $H_3PO_4$ are admixed at relative rates of flow which result in formation of a mixture having an average pH value between 7.7 and 8.3 and in maintenance of the mixture at pH values within this range. This difference in procedure, although seemingly small, causes a great change in physical properties of the product. It results in formation of a product of greater settling rate and of lower water-content, after settling or being filtered, than is obtained by the method of Britton et al. Also, the freshly precipitated product made in accordance with this invention, has an appearance under a microscope of 440 magnification of a mass of cockleburs. The Britton et al. application describes its filtered calcium nickel phosphate product as being a solid, amorphous, gel-like substance. Accordingly, calcium nickel phosphates made by the present method are new products which resemble those of said Britton et al. application in chemical composition and catalytic action, but differ from the phosphates of Britton et al. in microscopic appearance and in rate of settling from aqueous suspensions thereof.

As starting materials for use in the process of this invention, we may employ a basic-reacting substance, e. g. ammonia, a water-soluble amine such as dimethylamine, trimethylamine, ethylamine, diethylamine, or triethylamine; sodium hydroxide; sodium carbonate; potassium acetate; or an ammonium or alkali metal ortho-phosphate; etc., and aqueous solutions of water-soluble calcium and nickel salts, e. g. chlorides, bromides or nitrates of calcium and nickel. I preferably employ ammonia, or an aqueous ammonium hydroxide solution, as one starting material and an aqueous solution of ortho-phosphoric acid and the calcium and nickel salts as the other starting material. It is important that the starting materials contain the water-soluble calcium and nickel salts in relative proportions corresponding to between 6.5 and 12, preferably between 7.5 and 9.2, atoms of calcium per atom of nickel. A water-soluble phosphate, preferably ortho-phosphoric acid, is advantageously used in amount slightly exceeding that theoretically required to combine the calcium and nickel to form a normal calcium nickel phosphate, but it may be used in smaller, or larger, proportions if desired. Upon mixing the starting materials under the pH conditions of the invention, a normal calcium nickel phosphate is formed and precipitated, even though the soluble phosphate be present in amount smaller or greater than that theoretically required.

The aqueous solution of phosphoric acid and calcium and nickel salts may be of any dilution sufficient to dissolve the salts. It is advantageously prepared and stored in a concentration slightly less than that at which a calcium or nickel phosphate is precipitated and is diluted with water prior to, or during, flow to the reaction chamber where it is admixed with ammonia, or other alkali. In practice, the starting materials, when fed to the reaction chamber, contain water in amount such that the slurry which is formed contains less than 10, and usually less than 5 per cent by weight of the flocculent calcium nickel phosphate product. Employment of such large proportion of water is advantageous in that it permits more ready and accurate control of the pH value of the reaction mixture than would be possible when using the reactants in a state of higher concentration. However, the reactants can be used in more concentrated form, if desired.

The procedure in producing the calcium nickel phosphate catalyst will be explained with reference to a continuous mode of forming the catalytic material using, as starting materials, gaseous ammonia and an aqueous solution of phosphoric acid and calcium and nickel salts in the relative proportions hereinbefore recommended and in concentrations slightly less than would result in precipitation of a metal salt directly from the phosphoric acid-containing solution. The aqueous solution of phosphoric acid and calcium and nickel salts is passed into a stream of water at a rate such as to be diluted, usually with from 20 to 40 times its volume of water. The resultant dilute solution is fed into a tank, or other reaction vessel. Ammonia gas is, at the same time, fed into the tank at a point remote from the point of feed of the phosphoric acid-containing solution and at a rate such as to neutralize the acid with formation of a mixture of average pH value between 7.7 and 8.3. By use of well-known flow control devices, the rate of flow of either, or both, starting materials may automatically be controlled in accordance with the electric conductivity of the reaction mixture so as to maintain the mixture at a substantially constant pH value.

It should be mentioned, however, that phosphates present in the reaction mixture have somewhat of a buffering action which interferes with (but does not prevent) electrolytic determination of the pH value and that the electric conductivity measuring device usually employed as part of such automatic flow control apparatus tends to drift gradually in its readings and should periodically be checked and recalibrated. Readings of such instrument may be checked by withdrawing a sample of the reaction liquor, permitting the phosphate product to settle, and determining the basicity of the clear supernatant liquor by titration with a standard solution of hydrochloric acid or other acid. When the reaction mixture contains a 9 per cent excess of phosphates over that present as calcium nickel phosphate, and contains 0.75 per cent by weight of the latter, and is of a pH value of approximately 8.1, 14 cubic centimeters of a 0.1 normal hydrochloric acid solution is required to neutralize, to the end point of methyl orange, 100 cubic centimeters of the clear supernatant liquor of the settled reaction mixture. According to the titration, the supernatant liquor is of a basicity corresponding to that of a 0.014 normal aqueous ammonium hydroxide solution.

During feed of the starting materials to the reaction vessel, material within the chamber is stirred vigorously. Calcium nickel phosphate is thereby precipitated in a flocculent form which is maintained in suspension by the stirring. Once the process is started, the precipitation occurs in the presence of a slurry of calcium nickel phosphate.

Feed of the starting materials is advantageously continued so as to fill the reaction vessel and cause overflow of the phosphate slurry, e. g. through an overflow line. Material overflowing may be fed directly to a filter, but is preferably passed to a settling tank where the phosphate settles quite rapidly to form a lower layer that usually occupies only from 5 to 15 per cent of the volume of the slurry fed to the tank. In the absence of agitation, settling is substantially complete after about 5 minutes of standing. Feed of the slurry to a settling tank is somewhat advantageous over direct feed to a filter, in that the precipitated phosphate improves slightly in catalytic activity upon standing for several hours in contact with the liquor from which it was precipitated. Also, a settling tank serves as a reservoir for storage of material and for blending together the insoluble phosphate produced over a period of a day or longer so as obtain a large quantity of product of substantially uniform quality throughout. When using a settling tank, the clear supernatant liquor is separated from the relatively dense sludge or slurry of precipitated phosphate by decantation, and the phosphate sludge is fed to the filter.

Filtration is usually accomplished, either by feeding the mixture, or sludge, to the filter under an applied pressure, or by feeding the material to the filter at atmospheric pressure and pumping filtrate from the filter mechanically so as to draw liquor through the filter membrane as rapidly as possible. The residue is washed with water, e. g. city water of ordinary purity, to remove soluble impurities. The dense paste obtained as the filter cake usually consists of about 20 to 30 per cent by weight of metal phosphate and the remainder water. Upon being heated to 100° C. or higher, the filter cake material may be liquefied and be caused to flow readily through a line.

The filter cake is heated and caused to flow to a usual drying apparatus where it is further heated, e. g. at temperatures from 100° to 370° C., until substantially free of water. The dried product is usually ground to the form of a powder capable of passing a 20 mesh screen. The powdered material is admixed with a lubricant such as graphite, or a hydrocarbon oil, and pressed into pellets, as described in the aforementioned Britton et al. application, Serial No. 529,404. Frequently, prior to pressing the material into pellets, a minor amount of chrome oxide is admixed therewith as a catalyst promoter.

The catalyst, as just described, is heated in a stream of an oxygen-containing gas, preferably a mixture of air and steam, at temperatures usually in the order of 450° to 750° C. for purpose of oxidizing and removing the lubricant. In use of the catalyst for the dehydrogenation of an olefine, a vapor mixture of the olefine and steam is passed through a bed of the catalyst pellets at temperatures in the order of from 550° to 700° C. A considerable part of the olefine, e. g. butylene, is thereby converted to a corresponding conjugated diolefine which is separated from the reaction vapors by methods known to the art. In employing the catalyst for dehydrogenation of butylene, butadiene has been produced in amounts corresponding to from 15 to 50 per cent of the weight of hydrocarbons in the reacted mixture and in yields of 80 per cent theoretical or higher, based on the butylene consumed. The catalyst may similarly be used in dehydrogenating isoamylene to form isoprene, or in dehydrogenating 2,3-dimethylbutylene to form 2,3-dimethylbutadiene-1,3. Accordingly, a catalyst prepared by the method of the invention is of excellent catalytic activity and is well adapted to use in the production of conjugated diolefines from aliphatic olefines having from 4 to 6 carbon atoms in the molecule.

The method of making the catalyst, as just described, may be modified without appreciable change in the results obtained. For instance, instead of employing gaseous ammonia as a starting material, an aqueous solution of ammonia or other alkaline substances such as alkaline ammonium salts, sodium hydroxide, potassium hydroxide, or a water-soluble amine, can be used. Ammonia, as such or in aqueous solution, is most conveniently employed and is preferred. Also, instead of of using a single aqueous solution of phosphoric acid and calcium and nickel salts as a starting material, one or more of these solutes may be fed to the reaction vessel as a separate aqueous solution thereof. For instance, a suitable set of starting materials for formation of the calcium nickel phosphate product is an aqueous solution of di- or tri-ammonium phosphate and an aqueous solution of soluble calcium and nickel salts. The procedure in using such starting materials for production of the rapid-settling form of calcium nickel phosphate is as hereinbefore described with regard to the use of ammonia and a solution of phosphoric acid and calcium and nickel salts as starting materials.

The following examples describe certain ways in which the principle of the invention has been applied, but are not to be construed as limiting its scope.

Example 1

Nickel nitrate, calcium chloride and orthophosphoric acid were dissolved in a city water (containing soluble chloride salts in amount chemically equivalent to about 130 parts of NaCl per million parts of the water) to form a solution which had a specific gravity of 1.315 at 25° C. and contained approximately 8 gram atomic weights of calcium per gram atomic weight of nickel. The solution contained a 9 per cent excess of phosphoric acid over the amount theoretically required for the formation of normal calcium nickel phosphate material by reaction with the calcium and nickel salts. This solution was passed at a rate of 1 gallon per minute into admixture with a stream of water flowing at a rate of 33 gallons a minute. The resultant relatively dilute solution was fed into a tank where it was subjected to stirring. Gaseous ammonia was at the same time fed into the tank at a rate such as to bring the resultant mixture to a pH value between 7.8 and 8.3. The points of feed of the ammonia and of the phosphoric acid-containing solution were 6 feet from one another. Throughout the major portion of the run, the mixture was maintained at a pH value of about 8.1. During admixture of the materials, a normal calcium nickel phosphate material formed and coagulated as fine flocks which were maintained in suspension due to continued stirring of mixture. As inflow of the starting materials was continued, the mixture was caused to overflow from the reactor through a line leading to a settling tank of approximately 6800 gallons capacity. The overflowing slurry contained about 0.75 per cent by weight of flocculent calcium nickel phosphate. The tank gradually filled, with quite rapid settling of the phosphate product and formation of a lower layer of a concentrated phosphate slurry in amount corresponding to about 10 per cent of the volume of the liquor fed to the settling tank. While continuing flow of the slurry to the settling tank, the clear supernatant liquid layer was permitted to overflow to a drain. After 24 hours of operation, as just described, flow of the phosphate slurry was diverted to another settling tank. The clear supernatant liquid remaining in the first tank was removed by decantation. The residual thick aqueous slurry contained approximately 7.5 per cent by weight of calcium nickel phosphate. It was passed to a filter provided with a pump for withdrawing filtrate therefrom and the phosphate was washed with city water while on the filter. As a filter cake, there was obtained a thick semi-solid paste containing about 20 per cent by weight of the precipitated metal phosphate and about 80 per cent of water. The paste was removed from the filter and liquefied by heating the same to about 100° C. The liquid material was fed to a continuous drying apparatus heated at a temperature of 180° C. During travel through the drier, a considerable amount of water was evaporated and the phosphate caused to solidify with formation of lumps containing about 50 per cent by weight of water. Material from the drier was heated for about 1 day in an oven maintained at a temperature of 180° C., whereby the remainder of the water was evaporated. The dried material was ground to a powder capable of passing a 12 mesh screen. The powdered material was admixed with about 2 per cent by weight of graphite and pressed into pellets of about $\frac{3}{16}$ inch diameter. The pelleted material is suitable for use as a catalyst for the dehydrogenation of butylene to produce butadiene. It may be mentioned that, during operation in the continuous manner just described, the rate of flow of ammonia to the reaction chamber for formation and precipitation of the metal phosphate catalyst was automatically controlled in accordance with the pH value of the resultant reaction mixture. Electrical devices for such automatic control of a rate of feed, in accordance with changes in an electrical characteristic of a system, are well known.

In another experiment wherein the same reactants were used in substantially the same proportions as just described, but in aqueous solution of the ortho-phosphoric acid, calcium chloride and nickel nitrate was added with stirring to an aqueous solution of ammonia in amount such that the final mixture had a pH value of approximately 8.1, calcium nickel phosphate of good catalytic activity was precipitated in a flocculent form which, on permitting the mixture to stand without stirring for 24 hours, settled with formation of a lower layer of phosphate slurry. The lower layer occupied about half the volume of the entire mixture and contained about 1.5 per cent by weight of calcium nickel phosphate.

Example 2

An aqueous di-ammonium phosphate solution and an aqueous solution of calcium chloride and nickel nitrate in relative proportions corresponding to 8 atoms of calcium per atom of nickel, were fed at points about 1 foot apart into a reaction vessel while stirring the resultant mixture. The relative rates of flow of the starting materials were such as to obtain a mixture having a pH value of about 8.1 and such as to maintain the mixture at this pH value during addition of the starting materials. Calcium nickel phosphate, of good activity as a catalyst for the dehydrogenation of butylene to form butadiene, was thereby precipitated with formation of a thin slurry containing about 0.75 per cent by weight of the phosphate. On permitting the mixture to stand without stirring, the calcium nickel phosphate settled in 5 minutes to form a lower phosphate slurry layer which occupied about 12 per cent of the volume of the entire mixture. After 30 minutes of standing, the lower layer occupied only 10 per cent of the total volume. The settled phosphate slurry layer contained about 7.5 per cent by weight of calcium nickel phosphate.

Another experiment was carried out similarly, except that the aqueous solution of phosphoric acid and calcium and nickel salts was added with stirring to the aqueous ammonium phosphate solution. On completion of the addition, the mixture had a pH value of 8.1 and contained approximately 0.75 per cent of flocculent calcium nickel phosphate. The mixture was permitted to stand without stirring for 16 hours. During this period, the phosphate settled to the extent of forming a lower layer of phosphate slurry which occupied about half of the total volume of the mixture.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. A method which comprises forming and precipitating a calcium nickel phosphate material, effective as a catalyst for the dehydrogenation of butylene to form butadiene, by simultaneously passing water-soluble alkaline substance, an aqueous solution of a calcium salt and an aqueous solution of a nickel salt, one of which starting materials comprises a water-soluble ortho-phosphate and the calcium and nickel salts being in relative proportions corresponding to from 6.5 to 12 atoms of calcium per atom of nickel, into a reaction zone at relative rates of flow such that the resultant mixture is of an average pH value between 7.7 and 8.3, agitating the mixture as it is formed, and retaining at least a portion of the precipitated calcium nickel phosphate material in the reaction zone while continuing introduction of the starting materials.

2. A normal calcium nickel phosphate material, prepared as described in claim 1, and having the property of settling from a dilute aqueous suspension thereof to form, as a lower layer of the mixture, an aqueous slurry of the calcium nickel phosphate material in a concentration of at least 5 per cent by weight, said normal calcium nickel phosphate material having an appearance under a microscope of a mass of cockleburs and when dried being effective as a catalyst for the dehydrogenation of butylene to form butadiene.

3. A method which comprises forming and precipitating a calcium nickel phosphate material, effective as a catalyst for the dehydrogenation of butylene to form butadiene, by passing a water-soluble basic nitrogen compound and an aqueous solution of calcium and nickel salts in relative proportions corresponding to from 7.5 to 9.2 atoms of calcium per atom of nickel, one of which starting materials comprises a water-soluble ortho-phosphate, simultaneously into a reaction zone at points of feed remote from one another and at relative rates of flow such that the resultant mixture is of an average pH value between 7.7 and 8.3, agitating the mixture as it is formed, and retaining at least a portion of the precipitated calcium nickel phosphate material in the reaction zone while continuing introduction of the starting materials.

4. A method, as described in claim 3, wherein the materials fed to the reaction zone comprise water in amount such that the aqueous phosphate slurry which is formed contains less than 10 per cent of the calcium nickel phosphate material.

5. A method which comprises forming and precipitating a calcium nickel phosphate material, effective as a catalyst for the dehydrogenation of butylene to form butadiene, by passing an aqueous solution of an alkaline ammonium ortho-phosphate and an aqueous solution of calcium and nickel salts, in relative proportions corresponding to between 7.5 and 9.2 atoms of calcium per atom of nickel and in amount not greater than that theoretically required for combination of the calcium and nickel with the ortho-phosphate to form a normal calcium nickel phosphate material, at points remote from one another into a reaction zone at relative rates of flow such that the mixture which is formed is of an average pH value between 7.7 and 8.3, stirring the mixture as it is formed, and retaining at least a portion of the precipitated calcium nickel phosphate material in the reaction zone while continuing introduction of the starting materials, the proportion of water in the materials fed to the reaction zone being such that the aqueous phosphate slurry which is formed contains less than 10 per cent of the calcium nickel phosphate material.

6. A method which comprises forming and precipitating a calcium nickel phosphate material, effective as a catalyst for the dehydrogenation of butylene to form butadiene, by passing a water-soluble alkaline substance, ortho-phosphoric acid, a water-soluble calcium salt, a water-soluble nickel salt and water together with the acid and said salts in amount sufficient to dissolve the salts, the calcium and nickel salts being in relative proportions corresponding to between 6.5 and 12 atoms of calcium per atom of nickel, simultaneously into a reaction zone at relative rates of flow such that the resultant mixture is of an average pH value between 7.7 and 8.3, agitating the mixture as it is formed and retaining at least a portion of the precipitated calcium nickel phosphate material in the reaction zone while continuing introduction of the starting materials.

7. A method which comprises forming and precipitating a calcium nickel phosphate material, effective as a catalyst for the dehydrogenation of butylene to form butadiene, by passing ammonia and an aqueous solution of ortho-phosphoric acid, a calcium salt and a nickel salt, which salts are in relative proportions corresponding to between 7.5 and 9.2 atoms of calcium per atom of nickel, simultaneously into a reaction zone at relative rates of flow such that the resultant mixture is of an average pH value between 7.7 and 8.3, stirring the mixture as it is formed, and retaining at least a portion of the precipitated calcium nickel phosphate material in the reaction zone while continuing introduction of the starting materials.

8. In a method of making a calcium nickel phosphate material which is effective as a catalyst for the dehydrogenation of butylene to form butadiene, the steps of passing, at points of feed remote from one another, ammonia and a dilute aqueous solution of ortho-phosphoric acid, a calcium salt and a nickel salt in relative proportions corresponding to between 7.5 and 9.2 atoms of calcium per atom of nickel with the calcium and nickel in total amount not exceeding that theoretically required for reaction with the phosphoric acid to form normal calcium nickel phosphate material, into a reaction zone at relative rates of flow such that the resultant mixture is of an average pH value between 7.7 and 8.3 while stirring the mixture, and retaining in the reaction zone at least a portion of the calcium nickel phosphate material which is thereby precipitated while continuing introduction of the starting materials.

9. A method, as described in claim 8, wherein materials fed to the reaction zone contain water in a proportion such that the phosphate slurry which is formed contains less than 10 per cent of the calcium nickel phosphate material.

10. A method, as described in claim 8, wherein materials fed to the reaction zone contain water in a proportion such that the phosphate slurry which is formed contains less than 10 per cent of the calcium nickel phosphate material, introduction of the starting materials is continued to fill the reaction zone to overflowing, the overflowing material is separated into a solution and residue, the residue washed with water, and the washed calcium nickel phosphate material thus obtained is dried.

11. A method, as described in claim 8, wherein gaseous ammonia and a concentrated aqueous solution of the ortho-phosphoric acid and calcium and nickel salts are used as starting materials, said concentrated aqueous solution is admixed with a steam of water during flow to the reaction zone, water being thus added in amount such that the aqueous phosphate slurry which is formed contains less than 10 per cent of the calcium nickel phosphate material, the introduction of reaction materials to the reaction zone is continued to cause overflow of the resultant aqueous phosphate slurry from said zone, separating the overflowing material into an aqueous solution and a residue comprising the calcium nickel phosphate material, washing the residue with water, and thereafter drying the calcium nickel phosphate material.

12. A method, as described in claim 8, wherein gaseous ammonia and a concentrated aqueous solution of the ortho-phosphoric acid and calcium and nickel salts are used as starting materials, said concentrated aqueous solution is admixed with a stream of water during flow to the reaction zone, water being thus added in amount such that the aqueous phosphate slurry which is formed contains less than 5 per cent by weight of the calcium nickel phosphate material, the introduction of reaction materials to the reaction zone is continued to cause overflow of the resultant aqueous phosphate slurry from said zone, material overflowing from said zone is caused to settle with formation of an upper layer of clear liquor and a lower layer of an aqueous slurry containing more than 5 per cent by weight of the calcium nickel phosphate material, the layers are separated, the lower layer is filtered and the residue of calcium nickel phosphate material is washed while on the filter, and thereafter the calcium nickel phosphate material is dried by heating the same at temperatures between 100° and 200° C.

SHELDON B. HEATH.

(References on following page)

REFERENCES CITED

The following references are of record in the file of this patent:

UNITED STATES PATENTS

| Number | Name | Date |
|---|---|---|
| 1,215,335 | Bosch | Feb. 13, 1917 |
| 2,084,511 | Small | June 22, 1937 |
| 2,415,705 | Rohner et al. | Feb. 11, 1947 |
| 2,442,319 | Britton et al. | May 25, 1948 |
| 2,442,320 | Britton et al. | May 25, 1948 |

FOREIGN PATENTS

| Number | Country | Date |
|---|---|---|
| 261,051 | Great Britain | Nov. 8, 1926 |

OTHER REFERENCES

Mellor: Comprehensive Treatise on Inorganic and Theoretical Chemistry, vol. XV, Longmans, Green & Co., N. Y., 1936, page 495.